US012078969B2

(12) United States Patent
Sano

(10) Patent No.: US 12,078,969 B2
(45) Date of Patent: Sep. 3, 2024

(54) ELECTRONIC DEVICE AND WRIST DEVICE

(71) Applicant: CASIO COMPUTER CO., LTD., Tokyo (JP)

(72) Inventor: Takashi Sano, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 593 days.

(21) Appl. No.: 17/205,142

(22) Filed: Mar. 18, 2021

(65) Prior Publication Data

US 2021/0302919 A1 Sep. 30, 2021

(30) Foreign Application Priority Data

Mar. 25, 2020 (JP) ................................ 2020-053582
Sep. 24, 2020 (JP) ................................ 2020-159198

(51) Int. Cl.
*G04G 21/04* (2013.01)
*G04G 17/04* (2006.01)

(52) U.S. Cl.
CPC ............. *G04G 21/04* (2013.01); *G04G 17/04* (2013.01)

(58) Field of Classification Search
CPC ........ H01Q 1/273; H01Q 9/0464; H01Q 1/48; H01Q 9/0471; H01Q 1/38; G04G 21/04; G04G 17/04; G04R 60/08
See application file for complete search history.

(56) References Cited

U.S. PATENT DOCUMENTS

2016/0056533 A1* 2/2016 Nissinen .................. H02H 9/04 343/702
2017/0018842 A1* 1/2017 Sano .................... H01Q 9/0407
2017/0040701 A1* 2/2017 Hanabusa ................ H01Q 7/00
2017/0179581 A1* 6/2017 Puuri ................... H01Q 9/0421
2019/0215794 A1 7/2019 Sayem et al.

FOREIGN PATENT DOCUMENTS

JP S62-204183 A 9/1987
JP 3982918 B2 9/2007
JP 2010-216809 A 9/2010
JP 4645911 B2 3/2011
JP 2013-183437 A 9/2013
JP 2018-087766 A 6/2018
JP 2019-086414 A 6/2019
JP 2019-525503 A 9/2019
JP 6668627 B2 3/2020
JP 2021158658 A 10/2021

OTHER PUBLICATIONS

Notice of Reasons for Refusal dated Apr. 26, 2022 received in Japanese Patent Application No. JP 2020-159198 together with an English language translation.
Notice of Reasons for Refusal dated May 28, 2024 received in Japanese Patent Application No. JP 2022-179650.

* cited by examiner

*Primary Examiner* — Edwin A. Leon
(74) *Attorney, Agent, or Firm* — Scully, Scott, Murphy & Presser, P.C.

(57) ABSTRACT

An electronic device includes a ring-shaped antenna element, a conductor and a dielectric. The conductor has the same potential as GND. The dielectric is interposed between the antenna element and the conductor. The antenna element, the dielectric and the conductor are disposed so as to lie on top of one another in plan view.

17 Claims, 11 Drawing Sheets

ELECTRONIC DEVICE AND WRIST DEVICE

CROSS-REFERENCE TO RELATED APPLICATIONS

This application is based upon and claims the benefit of priority from Japanese Patent Application No. 2020-053582 filed on Mar. 25, 2020 and Japanese Patent Application No. 2020-159198 filed on Sep. 24, 2020, the entire contents of which are incorporated herein by reference.

BACKGROUND

Technical Field

The present disclosure relates to an electronic and a wrist device.

Description of Related Art

A wristwatch capable of receiving satellite radio waves is disclosed in JP 2013-183437 A.

SUMMARY

According to an aspect of the present disclosure, there is provided an electronic device including:

a ring-shaped antenna element;

a conductor having a potential same as GND; and a dielectric interposed between the antenna element and the conductor, wherein the antenna element, the dielectric and the conductor are disposed so as to lie on top of one another in plan view.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

First Embodiment

Figure 1:
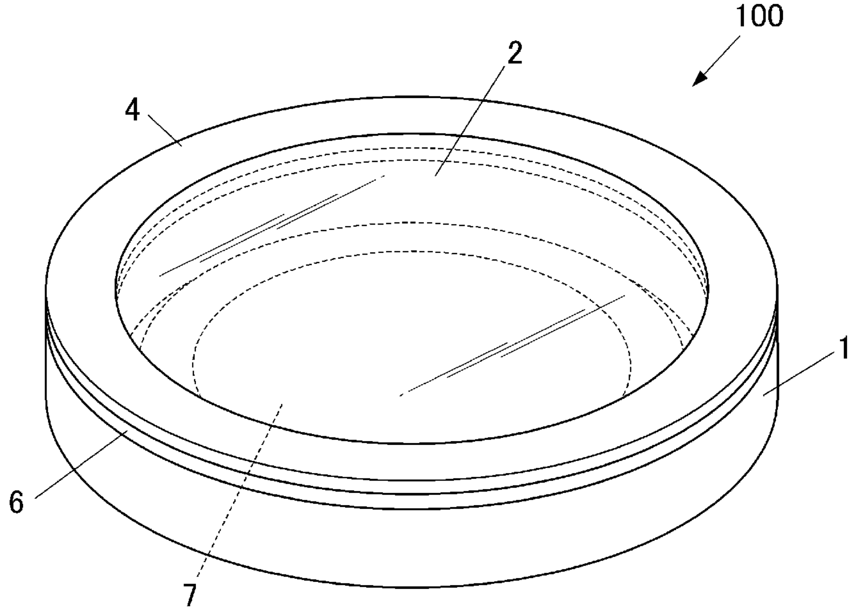
FIG. 1 is a perspective view showing the main part of a timepiece body as an electronic device according to a first embodiment.
Figure 2:
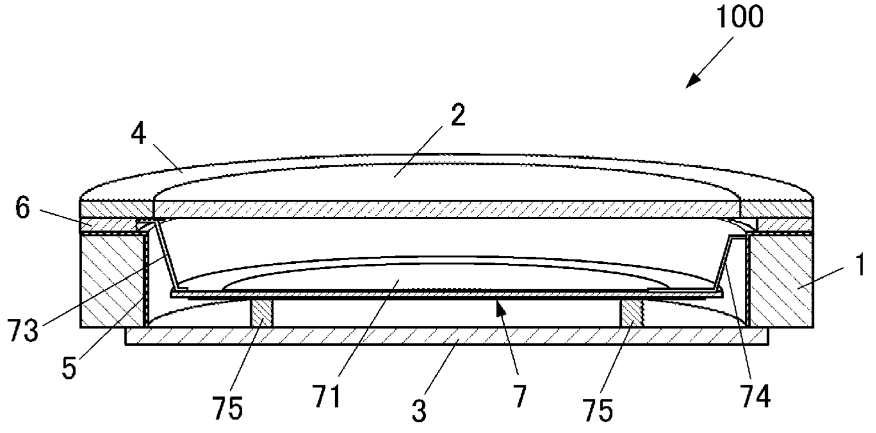
FIG. 2 is a side sectional view of the timepiece body shown in FIG. 1.

With reference to FIG. 1 and FIG. 2, a first embodiment of an electronic device according to the present disclosure and a wrist device to which this electronic device is applied will be described. In this embodiment, the body of a timepiece (hereinafter "timepiece body") is the electronic device, and as an example, a timepiece (wristwatch) configured by a belt attached to the body so as be worn on a wrist is the wrist device.

Although various limitations technically preferable are put on the embodiments or the like described below, the scope of the present invention is not limited to the following embodiments, illustrated examples or the like.

FIG. 1 is a perspective view showing the main part of a timepiece body as an electronic device of this embodiment. FIG. 2 is a side sectional view of the timepiece body shown in FIG. 1.

As shown in FIG. 1 and FIG. 2, a timepiece body 100 of this embodiment includes a short columnar hollow case ("body case 1" in this embodiment), which opens vertically in the thickness direction (opens on the front and back of the timepiece). The shape of the timepiece body 100 is not particularly limited.

In this embodiment, the body case 1 is formed of a hard resin, such as ABS resin, for example.

The material forming the body case 1 is not limited to resin, and other various materials, such as ceramic, are usable, for example. Alternatively, various composite materials in which carbon filler, glass fibers or the like is/are mixed with various resins may be used. The body case 1 formed of such a composite material can enhance the strength of the body case 1.

On the front surface side of the body case 1 (visible side or upper side of a timepiece), an optically transparent windshield member 2 (e.g. crystal) formed of transparent glass or the like is disposed so as to cover the opening.

On the back surface side of the body case 1, a back cover 3 that closes the opening is disposed. The back cover 3 may be formed of the same material as that of the body case 1, or may be formed of a different material. For example, when the body case 1 is formed of a resin, the back cover 3 may be formed of a metal.

In this embodiment, the back cover 3 is formed of a conductor, such as a metal, and this metal back cover 3 functions as GND too. That is, the back cover 3 is GND disposed below an antenna element 4, which will be described later.

Over (above) the upper portion of the body case 1, the antenna element 4 constituting an antenna (e.g. patch antenna) is disposed. That is, the body case 1 is interposed between the back cover 3 as GND and the antenna element 4. The antenna element 4 of this embodiment is a ring-shaped bezel member, and is configured to be resonant with radio waves of a desired frequency. The shape of the antenna element 4 is not limited to the illustrated example.

The material forming the antenna element 4 is not particularly limited. However, when conductivity of the forming material is low (when resistivity thereof is high), a sufficient antenna gain may not be obtained. Hence, as the material forming the antenna element 4, a metal material having a certain level of conductivity or higher (i.e. a certain level of resistivity or lower), such as SUS (stainless steel) or titanium, is preferably used. In addition, because it is not preferable that the timepiece body 100 as an electronic device become too heavy, the antenna element 4 is preferably formed of a material as light as possible.

When the antenna element 4 is disposed on the upper portion of the body case 1, the material forming the body case 1 affects antenna characteristics.

For example, in the case of the body case 1 formed of a resin material, when the antenna element 4 formed of a metal is disposed on the upper portion of the body case 1, and the metal back cover 3 is GND, a resin is present between the antenna element 4 and the GND that faces the antenna element 4.

Resin is generally an insulator(s) and also a dielectric(s) having a permittivity. When the antenna element 4 is disposed on the upper portion of the body case 1 formed of a resin, according to the permittivity, thickness, shape, adhesion, arrangement and so forth of the resin material, the frequency, matching, circularly polarized wave axis ratio, circularly polarized wave frequency and gain as an antenna change.

When the body case 1 is formed of only a resin material, the influence on the antenna characteristics can be dealt with to some extent by adjusting the matching or the arrangement. However, for example, when conductive fibers, carbon filler or the like are/is mixed with a resin, the resistance causes loss, and the gain as an antenna remarkably decreases.

That is, when the antenna element 4 is disposed on the upper portion of the body case 1, an electric field is generated in a form of, from the antenna element 4, passing through the body case 1 so as to face GND (e.g. back cover 3). In the case of the body case 1 formed of a composite material in which carbon filler or the like is mixed with a resin, it is inferred that an electric field passing through the body case 1 causes loss.

In this embodiment, a conductive part (conductor) 5 is disposed at a position that is on the upper portion of the body case 1 and faces the antenna element 4. That is, in this embodiment, the conductive part 5 is disposed below the antenna element 4 but on the upper portion of the body case 1 at least.

Thus, the conductive part 5, which is a metal sheet or thin film, disposed between the body case 1 and the antenna element 4 can prevent the generated electric field from passing through the portion where loss occurs. This can suppress occurrence of loss and maintain sensitivity of an antenna including the antenna element 4.

The conductive part 5 is preferably formed of a material having a lower resistance than the material of the body case 1 has. More specifically, the material forming the conductive part 5 is a metal, preferably a metal having a lowest possible resistance. To be more specific, aluminum or the like is suitably used. The material forming the conductive part 5 is not limited thereto, and various materials are usable as long as they are low-resistance conductors.

The thickness of the conductive part 5 is not particularly limited. The conductive part 5 may be formed of a sheet-shaped member, foil or the like that is pasted or a thin film formed by any type of vapor deposition, plating or the like.

It is assumed that, as the material of the body case 1, a material selected from various materials according to the use or the like of an electronic device, such as the timepiece body 100, is used. It is not preferable that performance of the antenna element 4 as an antenna differ depending on the material of the body case 1.

In this embodiment, the conductive part 5 is disposed at least on the upper portion of the body case 1, thereby being interposed between the body case 1 and the antenna element 4. This can prevent the body case 1, which is disposed under the conductive part 5, from affecting the antenna element 4, and enhance the degree of freedom in the material forming the body case 1.

The conductive part 5 is disposed, of the body case 1, at least on the upper portion (upper end surface) where the body case 1 faces the antenna element 4, but in this embodiment, as shown in FIG. 2, the conductive part 5 is disposed so as to cover a region from the upper portion to the inner surface of the body case 1. With this configuration, the antenna element 4 can be connected to GND (e.g. back cover 3 that functions as GND), namely, can be grounded, through the conductive part 5.

Thus, even when the antenna element 4 is disposed over the upper portion of the body case 1 formed of a resin, the antenna element 4 can be connected to GND through the connective part 5. Also, a dielectric member (dielectric) 6 disposed between the antenna element 4 and the conductive part 5 can contributes to appropriate wavelength shortening or the like, and cause the antenna element 4 to function as an antenna (e.g. patch antenna).

The conductive part 5 may be configured to cover a region from the upper portion (upper end surface) through the inner surface to the bottom surface of the body case 1, the bottom surface being the inner surface of the back cover 3. In this case too, the antenna element 4 can be connected to the back cover 3, which functions as GND, through the conductive part 5.

If the antenna element 4 is in direct contact with the conductive part 5, they short-circuit. Hence, an insulating member is disposed between the antenna element 4 and the conductive part 5. In this embodiment, the dielectric member 6 formed of a resin or the like is interposed between the conductive part 5 and the antenna element 4, thereby preventing the conductive part 5 and the antenna element 4 from contacting one another.

It is preferable that the characteristics and shape of the dielectric member 6 be set according to a function(s) required for the antenna element 4. Thus, the antenna characteristics can be easily adjusted by adjusting the dielectric member 6.

The material forming the dielectric member 6 is not particularly limited as long as it has insulating properties. For example, a resin having a high permittivity may be used.

In a timepiece, it is important to make the inside of a case watertight. The dielectric member 6 may be configured to make the inside of the body case 1 watertight between the body case 1 and the antenna element 4.

For example, when the conductive part 5 is a thin film formed by vapor deposition, plating or the like, the dielectric member 6 may be disposed on the conductive part 5, and pressed by the antennal element 4 as a bezel from the above.

The conductive part 5, which is disposed on the upper surface of the body case 1, may not be disposed to the outer peripheral end thereof, and the dielectric member 6 may be configured to make the inside of the body case 1 watertight at a portion where the conductive part 5 is not disposed.

The dielectric member 6 has a width that can stably support the antenna element 4 such that the antenna element 4 does not contact the conductive part 5, and does not necessarily cover the entire area of the conductive part 5 disposed on the upper portion of the body case 1.

When the dielectric member 6 is not required to have a function of keeping the water-tightness of the body case 1, the dielectric member 6 may not be disposed over the whole circumference of the upper surface of the body case 1.

In the body case 1, a substrate 7 provided with an electric circuit 71 is housed. The electric circuit 71 includes, for example, a resonant circuit, such as an LC circuit (not shown), and/or a detector IC mounted on the substrate 7.

More specifically, the substrate 7 is, for example, a resin substrate formed of a resin, and the electric circuit 71 is provided by forming a circuit pattern on the substrate 7.

The antenna element 4 is connected to the electric circuit 71 on the substrate 7 by a first connector 73. The first connector 73 is, for example, a coil spring.

The first connector 73 is for power supply, and the antenna element 4 is connected, through the first connector 73, to an LC circuit or the like as the electric circuit 71 mounted on the substrate 7.

To the electric circuit 71 on the substrate 7, a second connector 74 is connected from the antenna element 4. On the lower surface of the substrate 7, a connector member(s) 75 for electrically connecting the substrate 7 to the back cover 3 as GND, thereby grounding the antenna element 4, is disposed.

When, like this embodiment, the conductive part 5 is disposed on the inner surface of the body case 1 too, the antenna element 4 can be grounded without the connector member 75, but the connector member 75 may be disposed at a predetermined position so that the antenna element 4 can be grounded more stably and certainly.

Although not shown, other than the substrate 7, various members are housed in the body case 1.

Examples of the members that are housed in the body case 1 include a display unit constituting a display (not shown) of the timepiece body 100 and a module (not shown) that operates each part of the timepiece body 100.

Next, operation and effects of the timepiece body 100 as an electronic device will be described.

To form the timepiece body 100 of this embodiment, first, from the upper end surface to the inner surface of the body case 1, a conductive foil or sheet is disposed or a thin film is formed, so that the conductive part 5 is provided. Then, the metal back cover 3, which functions as GND, is attached to the opening part on the back surface side of the body case 1 so as to cover the opening. The back cover 3 as GND is electrically connected to the conductive part 5.

In the body case 1, the substrate 7 equipped with the electric circuit 71 and so forth are housed. Between the substrate 7 and the back cover 3, the connector member 75 is disposed so as to electrically connect the substrate 7 and the back cover 3.

The antenna element 4 as a metal bezel or the like is disposed above the conductive part 5 on the upper portion of the body case 1. To the antenna element 4, the first connector 73 for power supply and the second connector 74 for GND are connected, so that the antenna element 4 is connected to the substrate 7 through the first connector 73 and the second connector 74. Thus, the antenna element 4 is electrically connected to the back cover 3 as GND.

Then, the dielectric member 6 is disposed between the antenna element 4 and the conductive part 5 such that the antenna element 4 and the conductive part 5 do not contact one another.

Further, the windshield member 2 is attached to the opening part on the front surface side of the body case 1 so as to cover the opening.

At the time when power is supplied to the antenna element 4, and the antenna element 4 functions as an antenna, if there is no conductive part connected to GND, an electric field is generated in the form of, from the antenna element 4, passing through the body case 1 so as to face GND (e.g. back cover 3). When the body case 1 is interposed between the antenna element 4 and GND, an electric field passing through the body case 1 causes a large loss, depending on the material forming the body case 1.

In this embodiment, the conductive part 5 is disposed between the body case 1 and the antenna element 4. This can prevent the generated electric field from passing through the body case 1, and suppress occurrence of loss.

As described above, according to this embodiment, the timepiece body 100 as an electronic device includes: the ring-shaped antenna element 4; the conductive part 5 formed of a conductor and having the same potential as GND; and the dielectric member 6 interposed between the antenna element 4 and the conductive part 5, wherein the antenna element 4, the dielectric member 6 and the conductive part 5 are disposed so as to lie on top of one another in plan view.

As a specific configuration of this embodiment, the timepiece body 100 includes: the antenna element 4; the body case 1 disposed below the antenna element 4; the conductive part 5 disposed below the antenna element 4 but on the upper portion of the body case 1; the dielectric member 6 interposed between the conductive part 5 and the antenna element 4, thereby preventing the conductive part 5 and the antenna element 4 from contacting one another; and the back cover 3 electrically connected to the antenna element 4 and the conductive part 5 and functioning as GND.

The characteristics of an antenna are affected by the materials, shapes, positions and so forth of members, such as a body case and GND, disposed around the antenna. That is, various peripheral members are formed of metals, resins, composite materials thereof or the like, the properties of these materials are various, such as being conductive, insulating, dielectric and magnetic, and the characteristics, permittivity, magnetic permeability, loss (tanδ) and conductivity of these materials and their anisotropies affect the antenna characteristics.

Body cases 1 or the like are formable with various materials, which include various metals and resins. When body cases 1 are formed of different materials, their properties are different from one another.

When an antenna element 4 is disposed on the upper portion or the like of a body case 1, in order to make the antenna element 4 function as an antenna having desired characteristics, the antenna element 4 needs to be adjusted according to that body case 1 because the antenna characteristics are affected by the material forming the body case 1. This raises a problem that general-purpose antennas cannot be used.

For example, in JP 2013-183437 A, there is disclosed a wristwatch capable of receiving satellite radio waves. However, as described above, the characteristics of an antenna are affected by the materials, shapes, positions and so forth of members, such as a body case and GND, disposed around the antenna. Hence, it is still difficult to make an antenna function as an antenna having desired characteristics (frequency and gain).

The configuration of this embodiment, however, makes it possible, even if the body case 1 is formed of a material that causes a large loss when an electric field emitted from the antenna element 4 passes through the body case 1, such as a composite material in which carbon filler or the like is mixed with a resin, for the electric field not to pass through the body case 1.

This can suppress influence of the characteristics of the material of the body case 1, and produce a high-gain antenna. That is, regardless of the material forming the body case 1, occurrence of loss can be suppressed, and sensitivity of an antenna including the antenna element 4 can be maintained. This can enhance the degree of freedom in the material forming the body case 1 or the like, and let users enjoy rich variations in the external appearance and texture of the timepiece body 100.

In this embodiment, the conductive part 5 is a conductor film disposed on (at least a portion of) the upper surface and at least a portion of the inner surface of the body case 1.

When the conductive part 5 is constituted by a conductor film, the conductive part 5 can be easily configured by vapor deposition, plating or the like.

When the conductive part 5 is disposed so as to cover the body case 1 to the inner surface thereof, the antenna element 4 can be connected to GND (e.g. back cover 3 that functions as GND) through the conductive part 5.

When, like this embodiment, the characteristics and shape of the dielectric member 6 are set according to the function required for the antenna element 4 as an antenna, desired antenna characteristics or the like can be obtained by only adjusting the dielectric member 6, without, for example, changing the shape or the like of the body case 1.

The dielectric member 6 may double as a sealing member that makes the inside of the body case 1 watertight. That is, because the dielectric member 6 is a member formed of a resin or the like, the dielectric member 6 can be a sealing member by the resin being shaped into a waterproof packing or the like.

This, without a separate member, the inside of the body case 1 can be made watertight by the member for preventing the antenna element 4 and the conductive part 5 from short-circuiting.

When this timepiece body 100 is applied to a wrist device, such as a wristwatch, because the body case 1 are formable with various materials, the degree of freedom in design or the like is enhanced, and a wrist device rich in design can be produced.

Regardless of the material forming the body case 1, the antenna characteristics can be kept excellent.

In this embodiment, the antenna element 4 is disposed over the upper portion of the body case 1, but an exterior member that covers at least a portion of the antenna element 4 may also be disposed over the upper portion of the body case 1.

Figure 3:
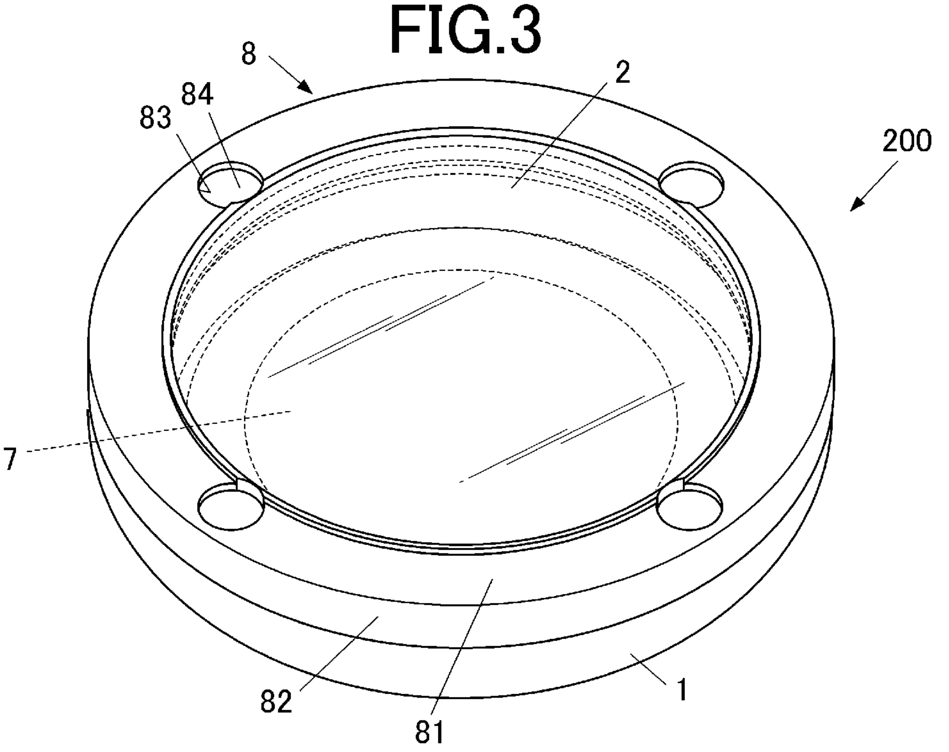
FIG. 3 is a perspective view showing the main part of a timepiece body according to a modification of the first embodiment.
Figure 4:
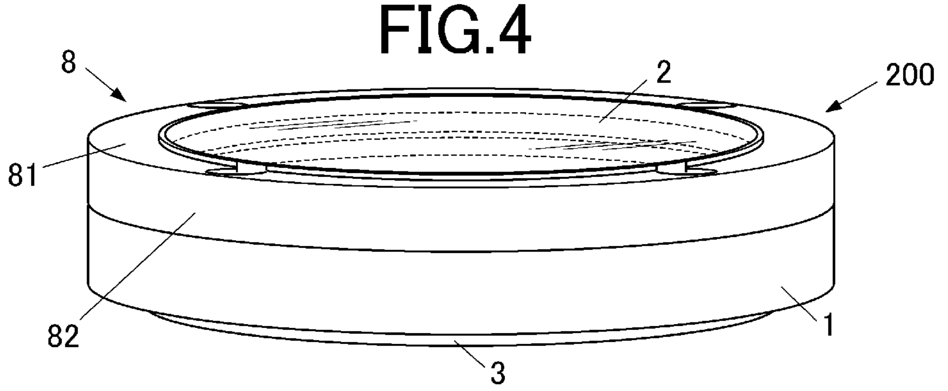
FIG. 4 is a perspective view of the timepiece body shown in FIG. 3 viewed from the side.
Figure 5:
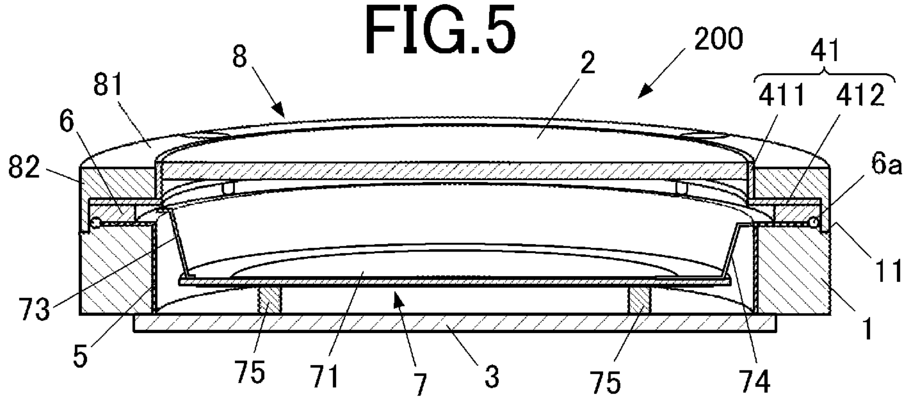
FIG. 5 is a side sectional view of the timepiece body shown in FIG. 3.

FIG. 3 to FIG. 5 show an example of the configuration of a timepiece body as an electronic device provided with an exterior member.

FIG. 3 is a perspective view of a timepiece body having an exterior member as viewed from the upper surface side. FIG. 4 is a perspective view of the timepiece body shown in FIG. 3 as viewed from the lateral surface side. FIG. 5 is a side sectional view of the timepiece body shown in FIG. 3.

In FIG. 3 to FIG. 5, the same members as those in FIG. 1 and FIG. 2 are denoted by the same reference signs, and descriptions thereof are omitted.

As shown in FIG. 3, a timepiece body 200 of this example includes a substantially-ring-shaped exterior member 8. In this example shown in FIG. 3 or the like, the exterior member 8 covers the whole antenna element 4.

The exterior member 8 includes: a ring-shaped body (hereinafter "member body") 81 disposed so as to cover the substantially-ring-shaped antenna element 4; and a hanging part 82 hanging from the outer peripheral edge of the member body 81.

The exterior member 8 is formed of, for example, a resin or the like, and the timepiece body 200 having an excellent design can be produced by varying the color and/or texture.

As shown in FIG. 3 to FIG. 5, the exterior member 8 covers the antenna element 4 and the dielectric member 6 such that they are invisible from the outside.

That is, as shown in FIG. 4 and FIG. 5, the hanging part 82 of the exterior member 8 is disposed so as to cover the antenna element 4, the conductive part 5 and the dielectric member 6 interposed between these. This can prevent the antenna element 4, the conductive part 5 and the dielectric member 6 from being visible as viewed from the outer surface side, and produce a very beautiful external appearance.

In the example shown in FIG. 4 and FIG. 5, the hanging part 82 of the exterior member 8 is configured such that its outer peripheral surface is substantially flush with the outer peripheral surface of the body case 1.

More specifically, as shown in FIG. 5, a step part 11 is formed by making the outer peripheral end of the upper end surface of the body case 1 one step lower than a portion closer to the center in a radial direction, and the hanging part 82 is housed in the step part 11.

With this configuration, the external appearance becomes excellent, and also because no step is generated between the body case 1 and the exterior member 8, dirt or the like hardly accumulates.

As shown in FIG. 5, in addition to the dielectric member 6, a waterproof O-ring 6*a* or the like that makes the inside of the body case 1 watertight may be provided. In this case, the conductive part 5 is disposed at most to the inner side of a position where the O-ring 6*a* is disposed.

This can produce a more reliable watertight structure.

In the example shown in FIG. 3 to FIG. 5, an antenna element 41 (metal bezel) includes a cylindrical part 411 and a flange 412 that projects outward from the lower end of the cylindrical part 411.

The inside diameter of the cylindrical part 411 is approximately the same as that of the body case 1. In the cylindrical part 411, the windshield member 2 is fitted.

How to attach the windshield member 2 is not particularly limited, but, for example, the windshield member 2 is press-fitted into the cylindrical part 411, thereby being fastened thereto. Between the windshield member 2 and the inner peripheral surface of the cylindrical part 411, a sealing member may be disposed.

Fastening the windshield member 2 by press-fitting the antenna element 41 formed of a metal material into the cylindrical part 411 can achieve firm fastening.

The flange 412 is disposed so as to face, of the body case 1, the upper portion (upper end surface) where the conductive part 5 is disposed. Between the lower surface of the flange 412 and the conductive part 5, the dielectric member 6 is disposed, thereby preventing the flange 412 of the antenna element 41 from contacting the conductive part 5.

The member body 81 of the exterior member 8 is provided with through holes 83 at points along the circumferential direction, and into the through holes 83, screws 84 are inserted from above the exterior member 8 toward the body case 1.

The exterior member 8 is screwed to the body case 1 (fastened thereto with the screws (84), which hereinafter may be referred to as "screw-fastened") in a state of being insulated from the antenna element 41.

That is, when the screws 84 formed of a metal material contact the antenna element 41, they short-circuit.

To deal with this, for example, through holes (not shown) larger than the through holes 83 are formed in the antenna element 41, and ring-shaped members or the like constituted by insulators are fitted into the through holes, and then the exterior member 8 is screw-fastened. This can prevent the antenna element 41 from contacting the screws 84 even when the exterior member 8 is fastened with the screws 84 formed of a metal, and fasten members from the exterior member 8 to the body case 1 without causing short-circuiting.

The exterior member 8 may be screw-fastened in the state of being insulated from the antenna element 41 so as to be in a conductive state with the conductive part 5. In this case, the conductive part 5 is provided with insertion holes having a size for the screws 84 to contact, and the screws 84 are inserted into the insertion holes of the conductive part 5. Thus, the screws 84 contact and are electrically connected to the conductive part 5.

When the exterior member 8 is thus configured, the metal screws 84 may be GND.

In this embodiment, the dielectric member 6 is provided as a single member, but not limited thereto.

Figure 6:
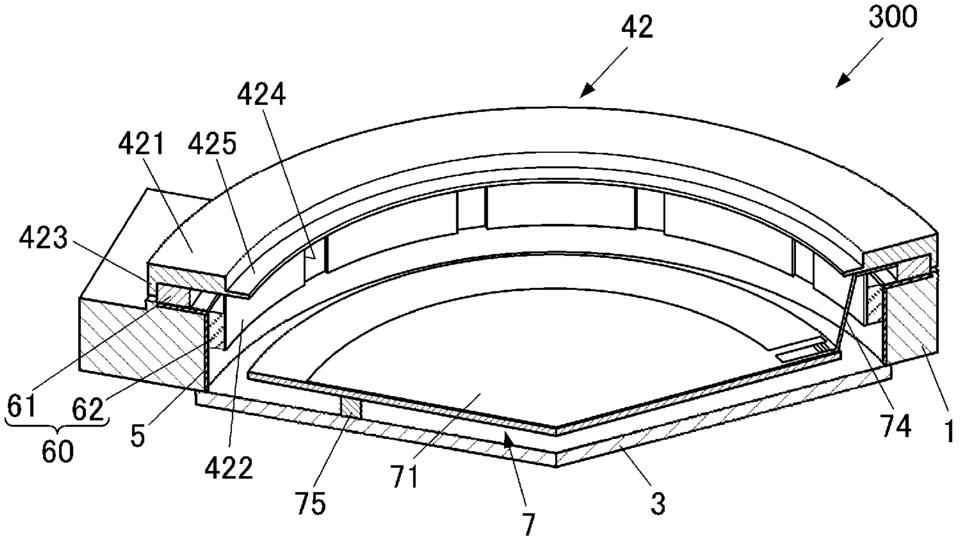
FIG. 6 is a sectional perspective view showing the main part of a timepiece body according to a modification of the first embodiment.

For example, like a timepiece body 300 shown in FIG. 6, a dielectric member 60 may be divided into two members of a first dielectric member 61 and a second dielectric member (second dielectric) 62. In the illustrated example, the first dielectric member 61 is disposed in contact with the upper portion of the body case 1, and the second dielectric member 62 is disposed in contact with the inner peripheral surface of the upper end portion of the body case 1.

In the example shown in FIG. 6, a metal bezel that is an antenna element 42 includes a body 421 disposed so as to face the upper portion (upper end surface) of the body case 1, a first hanging part 422 hanging from the edge on the inner peripheral side of the body 421, and a second hanging part 423 hanging from the edge on the outer peripheral side of the body 421.

In this case, the first dielectric member 61 is interposed between the conductive part 5 disposed on the upper portion of the body case 1 and the antenna element 42 (the body 421 of the antenna element 42), thereby preventing the conductive part 5 and the antenna element 42 from contacting one another.

The first dielectric member 61 may have a function as a sealing member that keeps the inside of the body case 1 watertight.

The first dielectric member 61 has a width that can stably support the antenna element 42 such that the antenna element 42 does not contact the conductive part 5, and does not necessarily cover the entire area of the conductive part 5 disposed on the upper portion of the body case 1.

When the first dielectric member 61 is not required to have a function of keeping the water-tightness of the body case 1, the first dielectric member 61 may not be disposed over the whole circumference of the upper surface of the body case 1.

The second dielectric member 62 is interposed between the conductive part 5 disposed on the inner surface of the body case 1 and the antenna element 42 (the first hanging part 422 of the antenna element 42), thereby preventing the conductive part 5 and the antenna element 42 from contacting one another.

The second dielectric member 62 may function as a member that adjusts the characteristics of the antenna element 42 as an antenna.

In this case, desired antenna characteristics can be achieved by changing the size (cross sectional area, thickness, width, etc.), shape or the like of the second dielectric member 62.

In the example shown in FIG. 6, the first hanging part 422 of the antenna element 42 is provided with slits 424 at predetermined intervals.

The antenna element 42 has an inward flange 425 that projects inward in the radial direction, and on this inward flange 425, the windshield member 2 is disposed.

In this state, the antenna element 42 is press-fitted into, thereby being fastened to, the body case 1. The slits 424 allow smooth press-fitting of the antenna element 42 into the body case 1.

The slits 424 can prevent the biting part of the antenna element 42 (bezel) on the body case 1 from operating as an extra antenna element.

The dielectric member 6 may be provided with a first alignment part, and the antenna element 4 may be provided with a second alignment part at a position corresponding to the first alignment part in a state in which the antenna element 4 is attached to the dielectric member 6, the second alignment part being fitted with the first alignment part. For example, a threaded portion 663 and a threaded portion 453 shown in FIG. 14 may correspond to the first alignment part and the second alignment part, respectively.

This makes it possible to dispose the antenna element 4 on the dielectric member 6 without misalignment.

The dielectric member 6 and the body case 1 may be formed in an integrated manner (as a single unit).

In this embodiment, the back cover 3, which is disposed below the antenna element 4 with the body case 1 in between, is formed of a conductor, such as a metal, and functions as GND, but GND is not limited to the back cover 3.

For example, when the substrate 7, a dial plate of a display (not shown) or the like housed in the body case 1 is formed of a metal material or the like, the substrate 7, the dial plate or the like may function as GND.

When the timepiece body as an electronic device includes a solar panel (not shown), the solar panel may function as GND.

The GND terminal of the electric circuit 71 in the body case 1 may be directly connected to the conductive part 5 disposed on the upper portion of the body case 1.

The position of GND is not particularly limited, and hence, depending on the member that functions as GND, GND may not be disposed below the antenna element 4, and/or the body case 1 may not be interposed between the antenna element 4 and GND. Such a case is included in the present disclosure.

Second Embodiment

Next, with reference to FIG. 7 to FIG. 22, a second embodiment of an electronic device according to the present disclosure and a wrist device including this electronic device will be described. While in the first embodiment, the body case 1 is formed of a resin material or the like, in this embodiment, the body case is formed of a metal material, which is different from the first embodiment. Hereinafter, points different from those in the first embodiment will be described, in particular.

In FIG. 7 to FIG. 22, the same members as those in the first embodiment are denoted by the same reference signs, and descriptions thereof are omitted.

Figure 7:
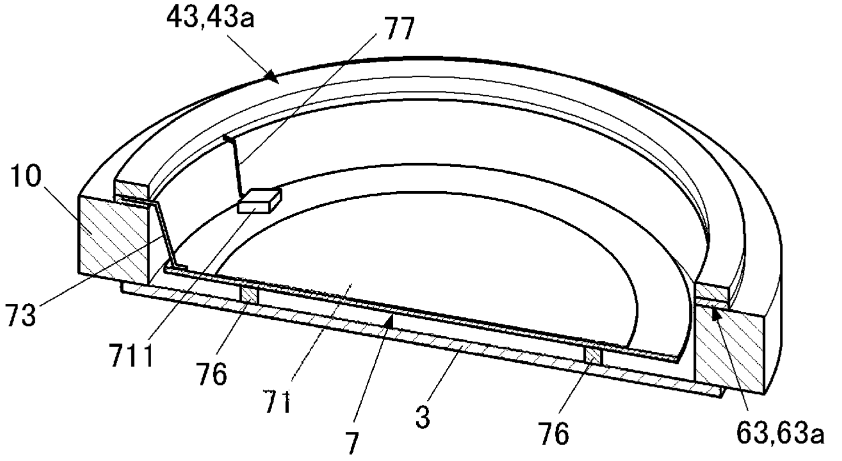
FIG. 7 is a sectional perspective view showing the main part of a timepiece body as an electronic device according to a second embodiment.

FIG. 7 is a sectional perspective view showing the main part of a timepiece body as an electronic device of this embodiment. In FIG. 7, among the members constituting the timepiece body, for example, the windshield member 2 is not shown.

As shown in FIG. 7, as in the first embodiment, a timepiece body of this embodiment includes a short columnar hollow body case 10, which opens vertically in the thickness direction (opens on the front and back of the timepiece). The timepiece body (the body case 10 of the timepiece body) is substantially ring-shaped in plan view from the above. The “ring-shaped” indicates not only a circular ring in plan view but also a wide range of various continuous shapes, such as an ellipse and a rectangle. The shape of the timepiece body (the body case 10 of the timepiece body) is not particularly limited.

In this embodiment, the body case 10 is formed of, for example, a metal material, such as SUS or titanium. The material forming the body case 10 is not limited to those exemplified herein.

In this embodiment, the body case 10 is formed of a conductor, such as a metal, and this metal body case 10 functions as a conductive part having the same potential as GND.

On the front surface side of the body case 10 (visible side or upper side of a timepiece), the windshield member is disposed so as to cover the opening, and on the back surface side of the body case 10, the back cover 3 that closes the opening is disposed. The back cover 3 may be formed of the same material as that of the body case 10, or may be formed of a different material. For example, when the body case 10 is formed of a metal, the back cover 3 may be formed of a resin.

When, like this embodiment, the body case 10 is formed of a metal material, the body case 10 itself is a conductive part. Hence, the conductive part of the first embodiment is unneeded, but may be provided additionally. In this case, the added conductive part is formed of a metal having a lower resistance than the metal forming the body case 10. That is, for example, when the body case 10 is formed of SUS, titanium or the like, the added conductive part is formed of aluminum or the like. As compared with the case where the conductive part (i.e. a thin film of aluminum or the like) is not added, loss as an antenna can be reduced, and a more sensitive antenna can be produced.

Over (above) the upper portion of the body case 10, an antenna element 43 constituting an antenna (e.g. patch antenna) is disposed. As in the first embodiment, the antenna element 43 of this embodiment is a ring-shaped bezel member, and is configured to be resonant with radio waves of a desired frequency.

The shape of the antenna element 43 is not limited to the illustrated example.

The material forming the antenna element 43 or the like is the same as that in the first embodiment, and hence description thereof is omitted.

The antenna element 43 is provided with a connector member 77 for connecting the antenna element 43 to the body case 10 as GND.

When, like this embodiment, the body case 10 itself is a conductive part, the antenna element 43 can be grounded without the connector member 77, but the connector member 77 is preferably disposed at a predetermined position so that the antenna element 43 can be grounded more stably and certainly.

The connector member 77 is connected to the substrate 7 (circuit board) as GND through an electronic component 711 that is, for example, a 0Ω resistance (R), a coil (L) or a capacitor (C). The GND as a connection destination of the connector member 77 may not be the circuit board, but the circuit board is preferable because the antenna characteristics are likely to be exhibited by connecting the antenna element 43 to the circuit board through a coil (L) or a capacitor (C).

The connection of the connector member 77 may be open.

In this embodiment, the body case 10, over the upper portion of which the antenna element 43 is disposed, is, as described above, a conductive part having the same potential as GND.

Hence, when the antenna element 43 is disposed over the upper portion of the metal body case 10, the antenna element 43 can be connected to GND through the body case 10.

However, if the antenna element 43 is in direct contact with the body case 10, they short-circuit. Hence, an insulating member is disposed between the antenna element 43 and the body case 10. In this embodiment, as in the first embodiment, a dielectric member 63 formed of a resin or the like is interposed between the body case 10 and the antenna element 43, thereby preventing the body case 10 and the antenna element 43 from contacting one another.

In this embodiment, the dielectric member 63 is ring-shaped so as to be substantially the same as the ring-shaped antenna element 43, and as shown in FIG. 7, is preferable to lie on the antenna element 43.

Thus, in this embodiment, in the timepiece body including: the ring-shaped antenna element 43; the body case 10 that functions as a conductive part having the same potential as GND; and the dielectric member 63 interposed between the antenna element 43 and the body case 10, the antenna element 43, the dielectric member 63 and the body case 10 lie on top of one another in plan view.

The dielectric member 63 has a width that can stably support the antenna element 43 such that the antenna element 43 does not contact the body case 10, and does not necessarily lie on the antenna element 43 with the same shape as the antenna element 43.

The material forming the dielectric member 63 is not particularly limited as long as it has insulating properties. For example, a resin having a high permittivity may be used. It is preferable that the material, shape and so forth of the dielectric member 63 be set according to the function required for an antenna constituted by the antenna element 43. The dielectric member 63 disposed as described above can contribute to appropriate wavelength shortening or the like, and cause the antenna element 43 to function as an antenna (e.g. patch antenna).

Preferably, the dielectric member 63 functions as a waterproof packing (sealing member) between the body case 10 and the antenna element 43 and makes the inside of the body case 10 watertight.

Thus, without a separate member, the inside of the body case 10 can be made watertight by the member for preventing the antenna element 43 and the body case 1 as a conductive part from short-circuiting.

When the dielectric member 63 is not required to have a function as a packing that keeps the water-tightness of the body case 10, the dielectric member 63 may not be disposed over the whole circumference of the upper surface of the body case 10.

As in the first embodiment, in the body case 10, the substrate 7 provided with the electric circuit 71 is housed. The antenna element 43 is connected to the electric circuit 71 on the substrate 7 by the first connector 73.

The first connector 73 is for power supply, and the antenna element 43 is connected, through the first connector 73, to an LC circuit or the like as the electric circuit 71 mounted on the substrate 7.

The substrate 7 is disposed on the back cover 3 through a spacer(s) 76 or the like.

When, like this embodiment, the antenna element 43 is disposed, through the dielectric member 63, over the upper portion of the body case 10 formed of a metal material, thereby configuring an antenna, the characteristics (gain and frequency) of the antenna can be adjusted by changing various conditions/factors.

Hereinafter, with reference to FIG. 7 to FIG. 11, how to adjust the antenna characteristics, such as the frequency and the gain, when the body case 10 is formed of a metal material will be described.

Figure 9:
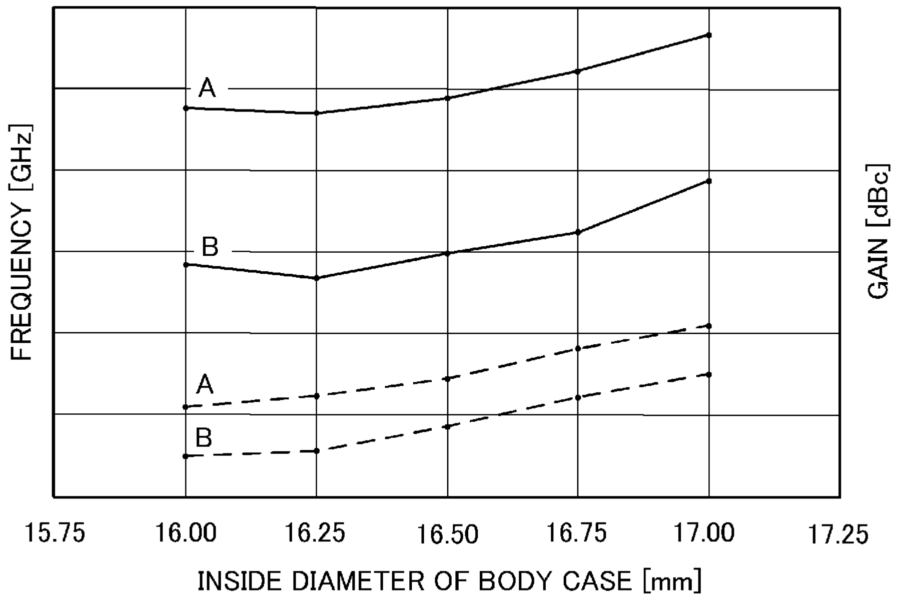
FIG. 9 is a graph showing results of a simulation in which the inside diameter of the body case is changed, thereby showing tendencies of change in frequency and gain.
Figure 11:
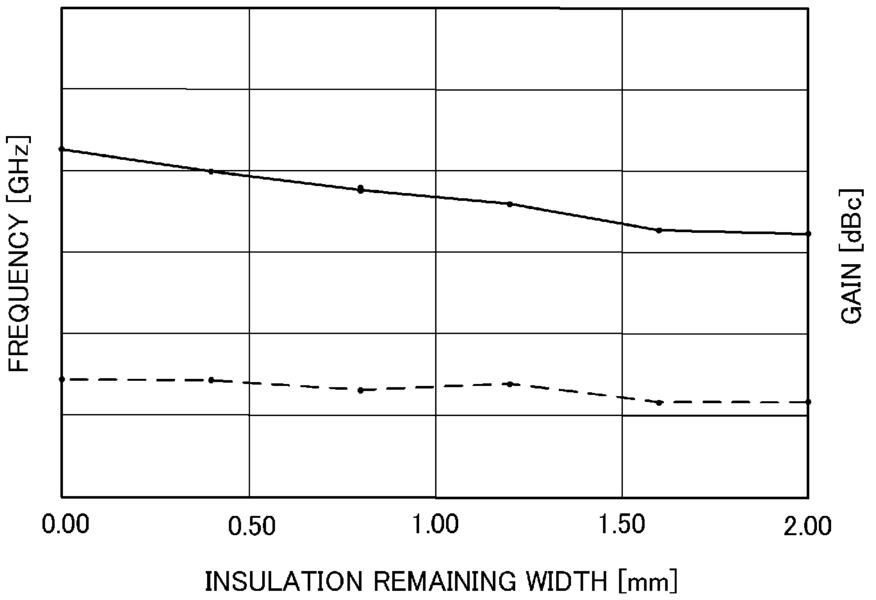
FIG. 11 is a graph showing results of a simulation in which the width insulated by a dielectric member is changed, thereby showing tendencies of change in frequency and gain.

Graphs shown in FIG. 9 and FIG. 11 show simulation results, which are different from actual measurement values.

In FIG. 7, on the upper surface of the body case 10, the dielectric member 63 and the antenna element 43 are disposed in this order along the edge of the opening of the body case 10.

In the example shown in FIG. 7, the antenna element 43 (an antenna element 43*a* and a dielectric member 63*a* lying thereon) has a width dimension in the radial direction that is approximately half the width dimension of the upper surface of the body case 10 in the radial direction.

In the example shown in FIG. 7, the whole antenna element 43*a* is placed over the upper portion of the body case 10. On the upper portion of the body case 10, the area of a portion where the antenna element 43*a* lies and the area of a portion where the antenna element 43*a* does not lie are approximately equal.

Figure 8A:
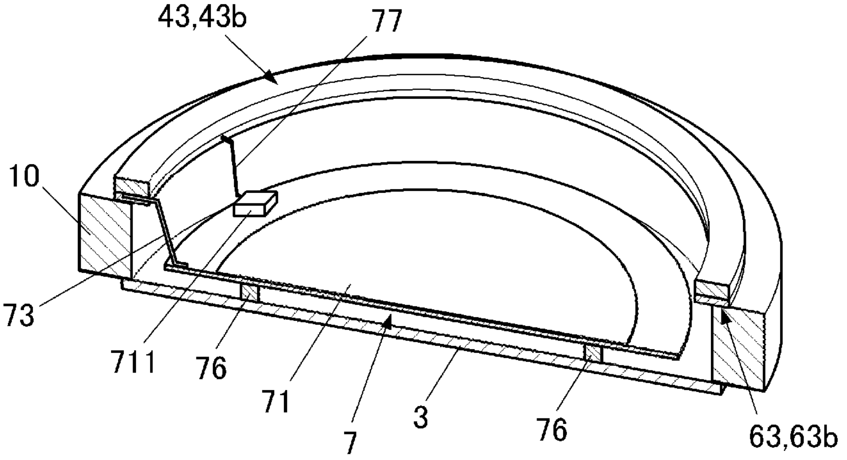
FIG. 8A is a sectional perspective view showing the main part of the timepiece body, wherein the inside diameter of a body case is larger than that shown in FIG. 7.

In an example shown in FIG. 8A, the inside diameter of the body case 10 is larger than that shown in FIG. 7. As a result of the increase of the inside diameter of the body case 1, the antenna element 43 (an antenna element 43*b* and a dielectric member 63*b* lying thereon) does not contact the upper surface of the body case 10 on the inner peripheral side for about half the width of the antenna element 43*b*, thereby being in a floating state.

Figure 8B:
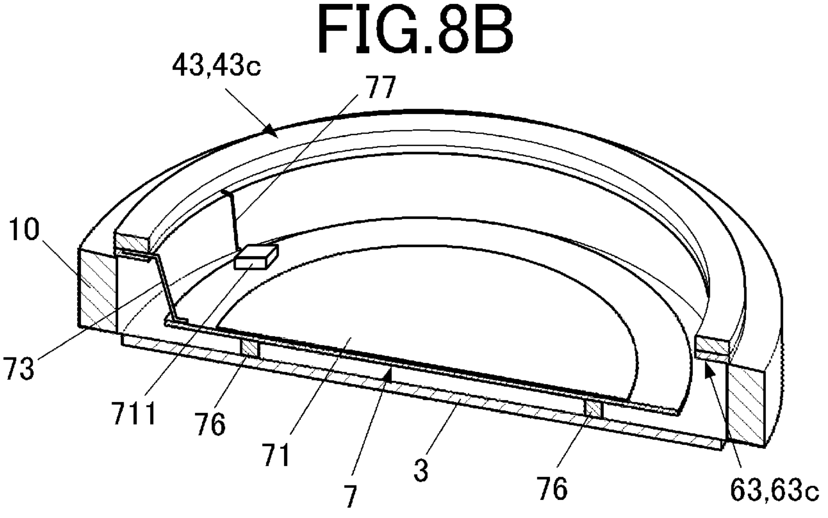
FIG. 8B is a sectional perspective view showing the main part of the timepiece body, wherein the inside diameter of the body case is larger than that shown in FIG. 8A.

In an example shown in FIG. 8B, the inside diameter of the body case 10 is larger than that shown in FIG. 8A. As a result of the increase of the inside diameter of the body case 1, the antenna element 43 (an antenna element 43*c* and a dielectric member 63*c* lying thereon) does not contact the upper surface of the body case 10 almost at all, thereby being in a floating state.

FIG. 9 shows results of a simulation in which the inside diameter of the body case 10 is changed such that the thickness of the body case 10 in the circumferential direction decreases, thereby showing tendencies of change in antenna characteristics.

FIG. 9 shows the frequency (GHz) on the vertical axis on the left side of the graph, the gain (dBc) on the vertical axis on the right side thereof, and the inside diameter (mm) of the body case on the horizontal axis.

In the graph, solid lines show the tendency of change in frequency, and broken lines show the tendency of change in gain. In the example shown in FIG. 9, regarding the results of the simulation conducted by using two types of dielectric members 63 having different permittivities A, B, the solid lines show the tendency of change in frequency, and the broken lines show the tendency of change in gain.

As shown in FIG. 9, in the simulation, both when the dielectric member 63 having the permittivity A was used and when the dielectric member 63 having the permittivity B was used, the following tendencies were confirmed: the larger the inside diameter of the body case 10 is, the higher the frequency is, and also the higher the gain is.

This indicates that the characteristics (frequency and gain) of an antenna configured by including the antennal element 43 can be adjusted by changing the area where the body case 10, the antenna element 43 and the dielectric member 63 lie on top of one another.

More specifically, regarding the width of the body case 10 in the radial direction on the upper portion thereof, it can be said that, on the upper portion of the body case 10, the smaller the width (area) of a portion where the dielectric member 63 and the antenna element 43 lie in this order is as compared with the width (area) of a portion where the dielectric member 63 and the antenna element 43 do not lie, the higher the frequency of an antenna configured by including the antenna element 43 is, and also the higher the gain thereof is.

As a method for changing the distance between the body case 10 and the antenna element 43 to change the antenna characteristics, other than changing the inside diameter of the body case 10, the following may be used, for example: forming an inner groove in the inner surface of the body case 10, thereby making the distance between the body case 10 and the antenna element 43 disposed over the upper portion of the body case 10 longer. It is inferred that distancing the inner surface of the body case 10 from the antenna element 43 by, for example, forming an inner groove can exhibit the same effects as those exhibited by making the inside diameter of the body case 10 larger.

Although not shown, when the distance between the body case 10 and the antenna element 43 was changed, the following tendencies were confirmed: the smaller the inside diameter of the antenna element 43 as a bezel member is, the higher the gain is, whereas the lager the inside diameter of the antenna element 43 is, the closer the antenna element 43 is to the body case 10, and accordingly the lower the gain is.

When the windshield member 2 was fastened by the antenna element 43 as a bezel member, the following tendencies were confirmed: the larger the diameter of the windshield member 2 is, the larger the inside diameter of the antenna element 43 is for the increased amount, and accordingly the lower the gain as an antenna is. When the inside diameter of the antennal element 43 was made to correspond to the diameter of the windshield member 2 by making the inner diameter of the antenna element 43 larger without changing the outside diameter of the antenna element 43, the width of the antenna element 43 in the radial direction became narrower. Hence, in this case, the following tendencies were confirmed: the gain decreases, but the frequency increases.

Although not shown, when the outside diameter of the body case 10 was changed, both the frequency and the gain of the antenna did not show significant change.

When the height of the body case 10 (distance from the substrate 7 to the back cover 3) was changed, the frequency did not show significant change, but the gain (sensitivity) showed a tendency to be higher as the height of the body case 10 is higher.

When the outside diameter of the antenna element 43 was changed, the size of the antenna element 43 was larger as the outside diameter was larger, and the frequency showed a tendency to be lower as the outside diameter of the antenna element 43 is larger. The gain did not show significant change.

Further, a simulation was conducted in which GND is set to the substrate 7, and the GND diameter is changed. When, like this second embodiment, the body case 10 was formed of a metal, both the frequency and the gain showed little change.

In this embodiment, the dielectric member (63) is disposed between the antenna element 43 and the body case 10 as a conductive part. The characteristics of an antenna configured by including the antenna element 43 may be adjusted by changing the shape of the dielectric member.

Hereinafter, with reference to FIG. 10A to FIG. 10D and FIG. 11, how to adjust the antenna characteristics, such as the frequency and the gain, by changing the shape of the dielectric member will be described.

FIG. 10A to FIG. 10D are main part's perspective views showing variations of the shape of the dielectric member. In FIG. 10A to FIG. 10D, in order to show the dielectric member to be seen well, the antenna element 43 and a lead line therefor are indicated by two-dot chain lines.

Figure 10A:
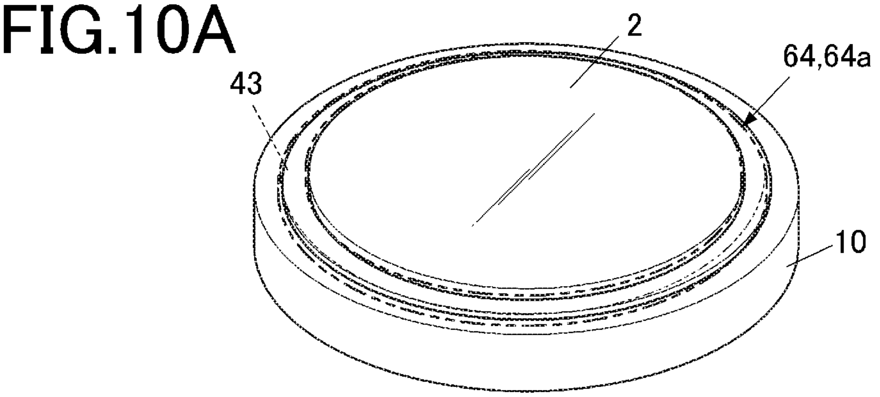
FIG. 10A shows an example of a ring-shaped dielectric member that is substantially the same as an antenna element in shape.

FIG. 10A shows a ring-shaped dielectric member 64 (64*a*) that is substantially the same as the antenna element 43 in shape. The dielectric member 64*a* has no cut or the like, and is in contact with the antenna element 43 over the entire width (e.g. 2.0 mm) of the dielectric member 64*a* in the radial direction. The insulation remaining width as a width where the antenna element 43 and the body case 10 as a conductive part are in an insulated state is 2.0 mm.

Figure 10B:
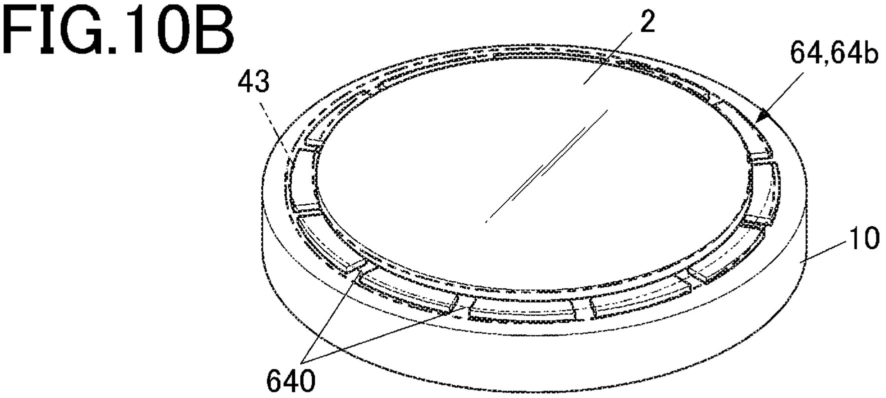
FIG. 10B shows an example of a dielectric member divided into a plurality of members.

FIG. 10B shows a dielectric member 64 (64*b*) that is divided into a plurality of members and disposed so as to be substantially ring-shaped to correspond to the antenna element 43 in shape. The dielectric member 64*b* is not in contact with the antenna element 43 at divided portions 640. Hence, the insulation remaining width as a width where the antenna element 43 and the body case 10 as a conductive part are in an insulated state is 0 mm.

Figure 10C:
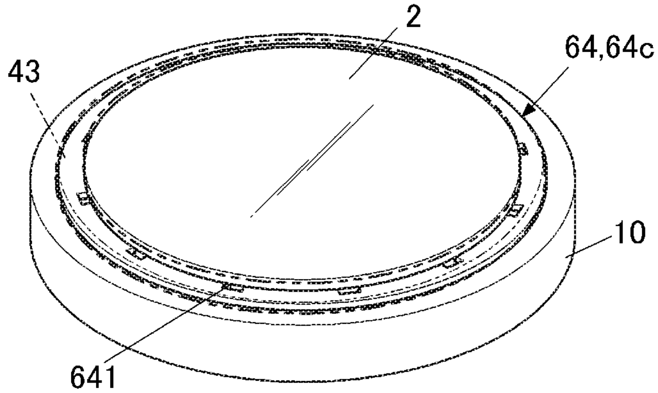
FIG. 10C shows an example of a dielectric member provided with recesses in the inner peripheral surface of the dielectric member.

FIG. 10C shows a ring-shaped dielectric member 64 (64*c*) that is substantially the same as the antenna element 43 in shape and provided with recesses 641 at points. The positions and the number of the recesses 641 are appropriately set. When the recesses 641 are disposed, the dielectric member 64*c* is in contact with the antenna element 43 at the recesses 641 over a width shorter than the width (e.g. 2.0 mm) of the dielectric member 64*a* in the radial direction. The insulation remaining width as a width where the antenna element 43 and the body case 10 as a conductive part are in an insulated state is about 1.2 mm.

FIG. 11 shows results of a simulation in which the insulation remaining width of the dielectric member 64 is changed, thereby showing tendencies of change in antenna characteristics.

Similarly to the graph shown in FIG. 9, FIG. 11 shows the frequency (GHz) on the vertical axis on the left side of the graph, the gain (dBc) on the vertical axis on the right side thereof, and the insulation remaining width (mm) on the horizontal axis thereof.

In the graph, solid lines show the tendency of change in frequency, and broken lines show the tendency of change in gain.

As shown in FIG. 11, in the simulation, the following tendencies were confirmed: the larger the insulation remaining width is, the lower the frequency is. The gain showed slight change due to the insulation remaining width.

When the insulation remaining width of the dielectric member 64 was changed, both the frequency and the gain did not change dramatically, but showed some change.

The shape of the dielectric member 64 does not appear in the external appearance of the timepiece body. In particular, when, like the insulation remaining width, the shape of the dielectric member 64 in the plane direction is changed, the shape or the like can be changed without the design being affected, relatively easily. Hence, this can be regarded as an effective method for adjusting the antenna characteristics, such as the frequency and the gain, to desired ones.

The method for changing the shape of the dielectric member 64 is not limited thereto.

For example, although in FIG. 10C, the recesses 641 are formed in the inner peripheral surface of the dielectric member 64, recesses may be formed in the outer peripheral surface of the dielectric member 64, or in both the inner peripheral surface and the outer peripheral surface of the dielectric member 64.

Also, the shape of the recesses may be any. For example, the recesses may be rectangular notches, semicircular notches or the like. The recesses may have different shapes from one another.

Figure 10D:
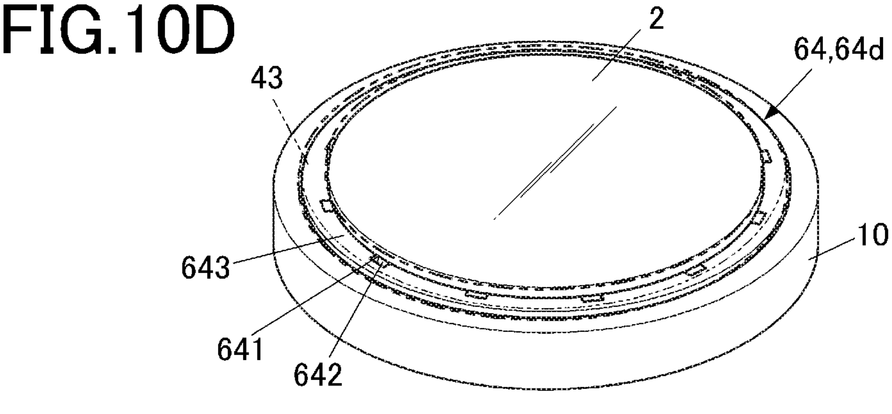
FIG. 10D shows an example of a dielectric member provided with the recesses shown in FIG. 10C, wherein other members are fitted in the recesses.

As shown in FIG. 10D, in the recesses 641 shown in FIG. 10C, second dielectric members 642 having a permittivity different from that of the body 643 of the dielectric member 64 may be fitted. The method for fitting the second dielectric members 642 is not particularly limited. The second dielectric members 642 may not be fitted in all the recesses 641, and also may not all be the same type.

When the second dielectric members 642 are fitted in the recesses 641 as separate/other members, the antenna characteristics can be finely adjusted to desired frequency and/or gain by appropriately changing the number, size and/or type (permittivity) of the second dielectric members 642.

Thus, the dielectric member 64 (64*d*) as a whole does not have a cut or unevenness, but is different in permittivity from the dielectric member entirely formed of one type of dielectric. This is inferred to affect the frequency and the gain as an antenna. Hence, this can be regarded an effective method for adjusting the frequency and the gain.

In FIG. 10D, the second dielectric members 642, which have a different permittivity from the body 643 of the dielectric member 64, are fitted in the in-plane direction of the dielectric member 64, but arrangement of a second dielectric member(s) is not limited thereto. For example, the second dielectric member(s) may be disposed in the layers-stacked direction of the dielectric member 64.

Further, although not shown, for example, a simulation was conducted in which the thickness of the dielectric member 64 in the height direction is changed. As a result, the following tendencies were confirmed: the thicker the dielectric member 64 is, the higher the frequency is, and also the higher the gain is.

If this method is adoptable giving consideration to the design/external appearance or the like of a timepiece, this can be regarded as one of the effective adjustment methods.

As described above, although there are various factors for adjusting the characteristics (frequency and gain) of an antenna configured by including the antenna element 43, adjustment of the inside diameter of the body case 10 and adjustment of the shape or the like of the dielectric member (in particular, the shape of the dielectric member in the plane direction) relatively largely affect the frequency and the gain of the antenna while little affecting the external appearance/design of the timepiece body. Hence, these can be regarded as effective methods for adjusting the antenna characteristics to, for example, desired frequency and/or gain.

As in the first embodiment, when the body case 1 is formed of a resin, the antenna element (metal bezel) is fastened to the body case 1 by, for example, being press-fitted into the body case 1, whereas as in this embodiment, when the body case 10 is formed of a metal, the antenna element can be fastened to the body case 10 by various methods as shown in FIG. 12 to FIG. 22, for example. In FIG. 12 to FIG. 22, the same members as those in this second embodiment shown in FIG. 7 or the like are denoted by the same reference signs, and descriptions thereof are omitted. The methods described hereinafter are merely examples, and the method for fastening the antenna element (metal bezel) is not limited thereto.

Figure 12:
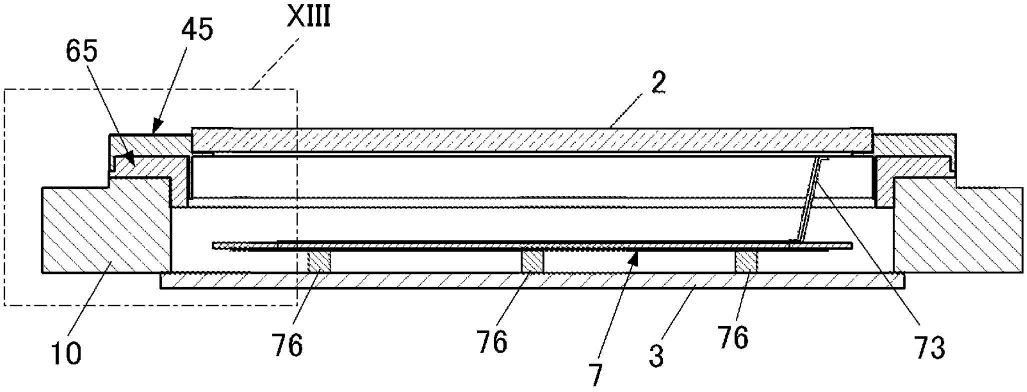
FIG. 12 is a side sectional view showing an example in which an antenna element is fastened to a body case formed of a metal material.
Figure 13:
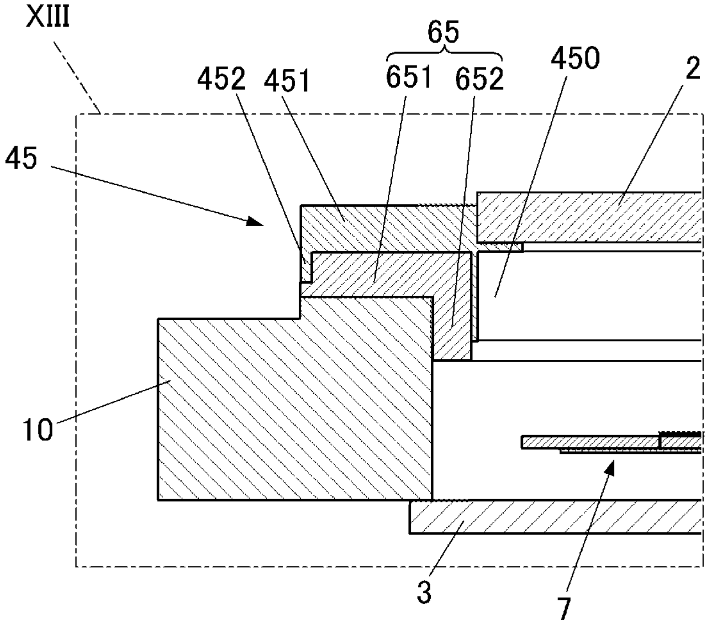
FIG. 13 is an enlarged view of a region XIII enclosed by a chain line in FIG. 12 and shows an example of an antenna element fastening structure.

FIG. 12 is a side sectional view showing an example in which an antenna element is fastened to a body case formed of a metal material. FIG. 13 is an enlarged view of a region XIII enclosed by a chain line in FIG. 12 and shows an example of an antenna element fastening structure.

As shown in FIG. 12 and FIG. 13, when an antenna element 45 (metal bezel) is fastened to the metal body case 10, the antenna element 45 is fitted into the opening of the body case 10 through a dielectric member 65.

In the example shown in FIG. 13, the antenna element 45 includes a cylindrical part 450, which is cylindrically shaped, a flange 451 projecting outward from the upper portion of the cylindrical part 450, and a blind 452 hanging from the outer peripheral end surface of the flange 451. In the cylindrical part 450, the windshield member 2 is fitted.

The dielectric member 65 includes: a dielectric body 651 disposed between the lower surface of the flange 451 of the antenna element 45 and the upper surface of the body case 10; and a cylindrical part 652 projecting downward from the inner end surface of the dielectric body 651 along the inner peripheral surface and disposed between the outer peripheral surface of the cylindrical part 450 of the antenna element 45 and the upper portion of the inner peripheral surface of the body case 10.

In this example, the dielectric member 65 is capable of fastening the antenna element 45 by deforming with some elasticity and generating stress, and is formable with various resins.

The antenna element 45 is press-fitted into the body case 10 through the dielectric member 65, and the dielectric member 65 functions as a waterproof packing (sealing member) that makes the inside of the body case 10 water-tight.

Thus, when the dielectric member 65 doubles as a waterproof packing (sealing member), a separate waterproof packing (sealing member), such as an O-ring, for the water-tightness is unneeded. This can reduce the number of parts.

Figure 14:
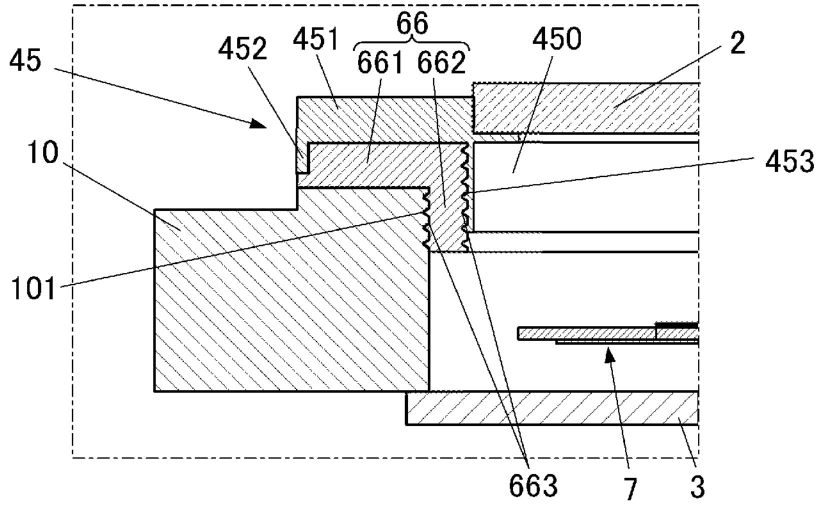
FIG. 14 is a side sectional view showing a modification of the antenna element fastening structure shown in FIG. 12.

FIG. 14 is a side sectional view showing a modification of the antenna element fastening structure shown in FIG. 12 and FIG. 13. In this modification, the configuration of the dielectric member is different from that shown in FIG. 12 and FIG. 13.

In FIG. 14, a dielectric member 66 is formed of a hard resin that hardly deforms, and includes: a dielectric body 661 disposed between the lower surface of the flange 451 of the antenna element 45 and the upper surface of the body case 10; and a cylindrical part 662 projecting downward from the inner end surface of the dielectric body 661 along the inner peripheral surface and disposed between the outer peripheral surface of the cylindrical part 450 of the antenna element 45 and the upper portion of the inner peripheral surface of the body case 10.

On the inner peripheral surface and the outer peripheral surface of the cylindrical part 662, threaded portions 663 are formed by thread-cutting.

On the outer peripheral surface of the cylindrical part 450 of the antenna element 45, a threaded portion 453 that meshes with the threaded portion 663 formed on the inner peripheral surface of the cylindrical part 662 is formed, so that the threaded portion 453 of the antenna element 45 and the threaded portion 663 of the dielectric member 66 mesh with one another.

On the upper portion of the inner peripheral surface of the body case 10, a threaded portion 101 that meshes with the threaded portion 663 formed on the outer peripheral surface of the cylindrical part 662 is formed, so that the threaded portion 101 of the body case 10 and the threaded portion 663 of the dielectric member 66 mesh with one another.

The dielectric member 66 is screwed on the body case 10 (fastened thereto with the threaded portions (663, 101), which hereinafter may be referred to as "thread-fastened"), and the antenna element 45 is screwed on this dielectric member 66 (fastened thereto with the threaded portions (453, 663)), so that the antenna element 45 is thread-fastened to the body case 10 through/with the dielectric member 66.

When the antenna element 45 is thread-fastened as described above, for example, as shown in FIG. 15 or FIG. 16, an O-ring(s) may be provided as a sealing member.

Figure 15:
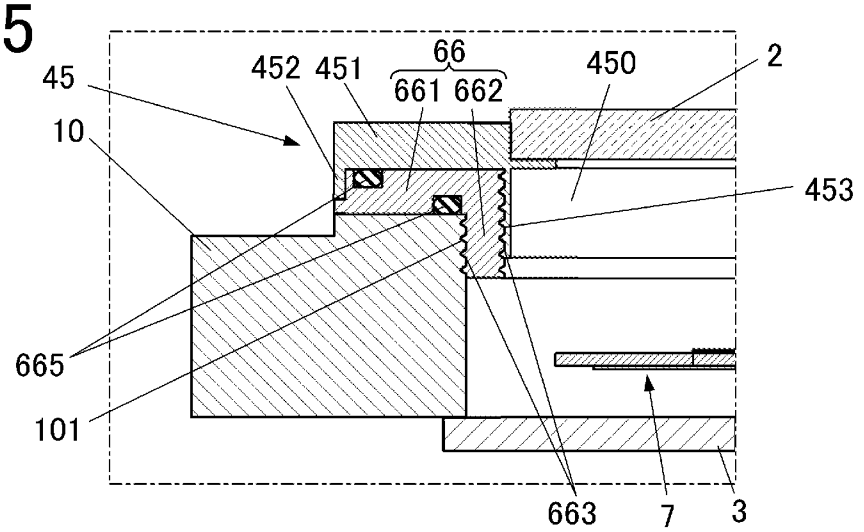
FIG. 15 is a side sectional view showing a modification of the antenna element fastening structure shown in FIG. 12.

That is, in FIG. 15, O-rings 665 are disposed between the upper surface of the dielectric body 661 and the lower surface of the flange 451 of the antenna element 45 and between the lower surface of the dielectric body 661 and the upper surface of the body case 10. Two O-rings 665 may not be disposed, and hence one O-ring 665 may be disposed on either the upper surface side of the dielectric body 661 or the lower surface side thereof.

Figure 16:
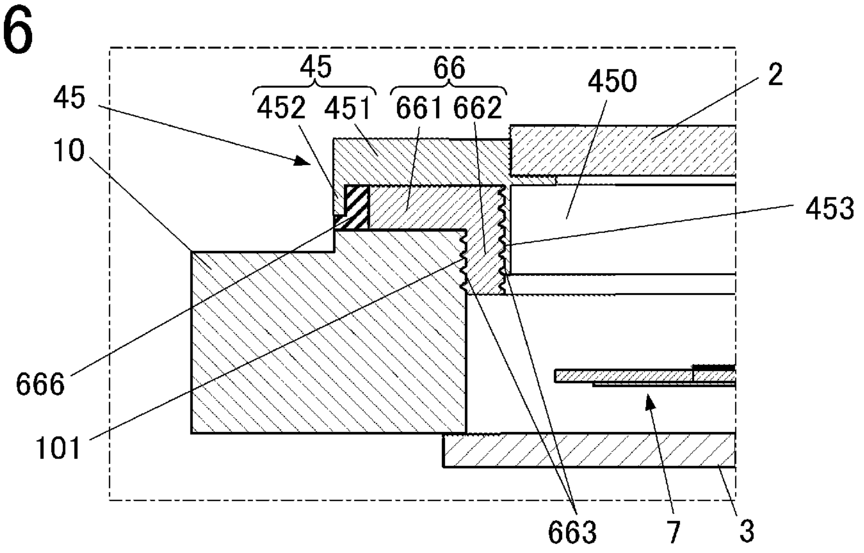
FIG. 16 is a side sectional view showing a modification of the antenna element fastening structure shown in FIG. 12.

In FIG. 16, the outward projecting width of the dielectric body 661 is made smaller than that of the flange 451 of the antenna element 45, and outside the outer peripheral surface of the dielectric body 661, an O-ring 666 is interposed between the lower surface of the flange 451 of the antenna element 45 and the upper surface of the body case 10.

When an O-ring(s) are provided as a sealing member(s) as shown in FIG. 15 or FIG. 16, the body case 10 can be made watertight with higher certainty.

The dielectric member is not limited to a single member.

Figure 17:
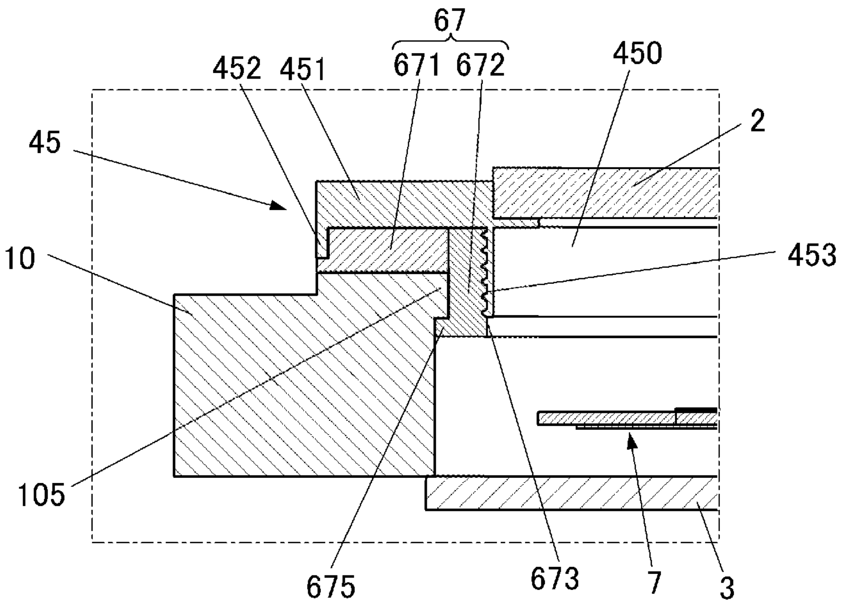
FIG. 17 is a side sectional view showing a modification of the antenna element fastening structure shown in FIG. 12.

For example, as shown in FIG. 17, there may be provided, as separate members, a dielectric body 671 disposed between the lower surface of the flange 451 of the antenna element 45 and the upper surface of the body case 10, and a cylindrical part 672 that is disposed between (i) the inner end surface of the dielectric body 671 and the upper portion of the inner peripheral surface of the body case 10 and (ii) the outer peripheral surface of the cylindrical part 450 of the antenna element 45, and has a threaded portion 673 on the inner peripheral surface.

The threaded portion 453 formed on the outer peripheral surface of the cylindrical part 450 of the antenna element 45 meshes with and is screwed on the threaded portion 673 formed on the inner peripheral surface of the cylindrical part 672. The upper portion of the body case 10 is provided with a projection 105 projecting inward, and the lower end portion of the cylindrical part 672 is provided with a flange 675 projecting outward. The flange 675 is fastened to the lower surface of the projection 105 of the body case 10, so that the antenna element 45 is thread-fastened to the body case 10 through the dielectric member 67 (the dielectric body 671 and the cylindrical part 672).

Figure 18:
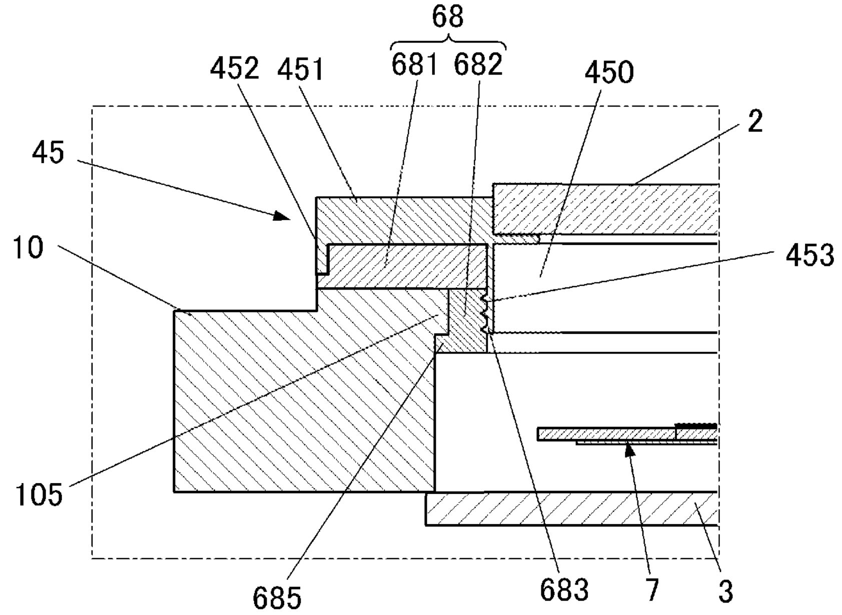
FIG. 18 is a side sectional view showing a modification of the antenna element fastening structure shown in FIG. 12.

Further, for example, as shown in FIG. 18, there may be provided, as separate members, a dielectric body 681 disposed between the lower surface of the flange 451 of the antenna element 45 and the upper surface of the body case 10, and a cylindrical part 682 that is disposed (i) on the inner peripheral side of the lower surface of the dielectric body 681 and (ii) between the upper portion of the inner peripheral surface of the body case 10 and the outer peripheral surface of the cylindrical part 450 of the antenna element 45, and has a threaded portion 683 on the inner peripheral surface.

The threaded portion 453 formed on the outer peripheral surface of the cylindrical part 450 of the antenna element 45 meshes with and is screwed on the threaded portion 683 formed on the inner peripheral surface of the cylindrical part 682. The upper portion of the body case 10 is provided with the projection 105 projecting inward, and the lower end portion of the cylindrical part 682 is provided with a flange 685 projecting outward. The flange 685 is fastened to the lower surface of the projection 105 of the body case 10, so that the antenna element 45 is thread-fastened to the body case 10 through the dielectric member 68 (the dielectric body 681 and the cylindrical part 682).

Thus, by dividing the dielectric member into a plurality of members, the members of the dielectric member can be formed of different materials from one another.

In particular, when, like the example shown in FIG. 18, there are separate members, namely, the dielectric body 681 and the member (cylindrical part 682) having the threaded portion 683, for example, the cylindrical part 682 having the threaded portion 683 may be formed of a hard material, and the dielectric body 681 may be formed of an elastic deformable material, so that the antenna element 45 can be thread-fastened to the body case 10 through the cylindrical part 682, and also the water-tightness can be ensured by making the dielectric body 681 function as a sealing member (waterproof packing).

When a structure, as shown in FIG. 17 or FIG. 18, in which a positional relationship between a body case and an antenna element (bezel) can be fixed is adopted, the body case, the dielectric member and the antenna element may be provided with alignment parts that are fitted with one another. In this manner, when the cylindrical part (672 in FIG. 17 or 682 in FIG. 18) of the dielectric member is inserted (twisted) from the back side (back cover side) of a timepiece, a mark engraved at the 12 o'clock position on the antenna element (bezel) can be matched with the 12 o'clock position on the body case, for example. Because a module as an inner structure having a dial plate and/or the like of the timepiece is also aligned with the body case, the 12 o'clock position on the dial plate can also be matched with the mark at the 12 o'clock position on the antenna element (bezel). Thus, their alignment is easily completed.

Further, as shown in FIG. 19 to FIG. 22, an antenna element 46, a dielectric member 69 and the body case 10 may be fastened with a screw(s).

Figure 19:
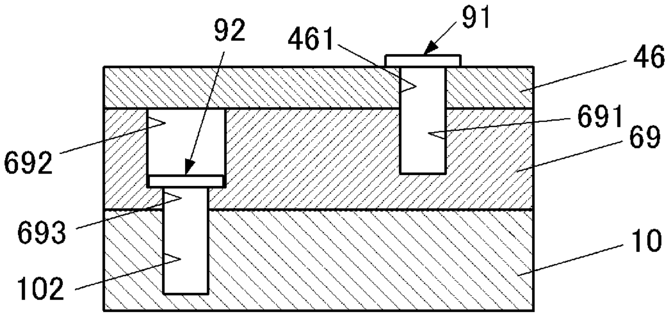
FIG. 19 is a side sectional view showing a modification of the antenna element fastening structure shown in FIG. 12.

That is, for example, as shown in FIG. 19, the antenna element 46 is provided with a through hole 461, and the dielectric member 69 is provided with a hole 691 at a position corresponding to the through hole 461. A screw 91 is inserted from above the antenna element 46 into the hole 691 through the through hole 461, so that the antenna element 46 and the dielectric member 69 are fastened with the screw 91.

A recess may be provided around the through hole 461 of the antenna element 46 so that the head of the screw 91 can be disposed in the recess. In this case, the head of the screw 91 does not project from the surface of the antenna element 46, so that a beautiful external appearance can be obtained.

The dielectric member 69 and the body case 10 are fastened with a screw 92. More specifically, the dielectric member 69 is provided with a through hole 693, and the upper portion of the through hole 693 is formed to be a large-diameter part 692, the diameter of which is larger than that of the head of the screw 92. The body case 10 is provided with a hole 102 at a position corresponding to the through hole 693, which includes the large-diameter part 692. The screw 92 is inserted from above the dielectric member 69 into the hole 102 through the through hole 693 (692), so that the dielectric member 69 and the body case 10 are screw-fastened. Although the depth of the through hole 693 (692) formed in the dielectric member 69 is not particularly limited, it is preferable that the through hole 693 be formed deep enough for the screw 92 not to float and contact the antenna element 46. In the through hole 693 (692), a member formed of an insulator (dielectric) may be interposed between the outer peripheral surface of the screw 92 and the through hole 693, or after the screw 92 is inserted, an adhesive (sealant) or the like formed of an insulating (dielectric) material may be put in the through hole 693 (692), or a member formed of an insulator (dielectric) may be fitted therein. This can prevent the screw 92 from contacting the antenna element 46 for sure.

To fasten the antenna element 46, the dielectric member 69 and the body case 10 with the screws 91, 92, first, the dielectric member 69 and the body case 10 are screw-fastened, next, the antenna element 46 is disposed thereon, and then the dielectric member 69 and the antenna element 46 are screw-fastened.

Figure 20:
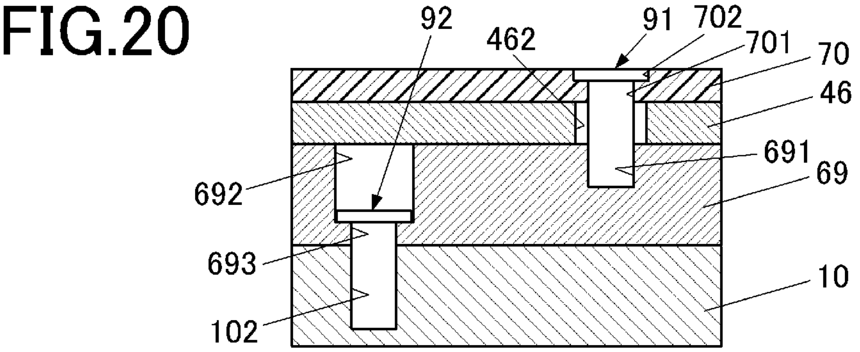
FIG. 20 is a side sectional view showing a modification of the antenna element fastening structure shown in FIG. 12.

Further, for example, as shown in FIG. 20, an exterior member 70 covering the antenna element 46 may also be provided. The exterior member 70 is a decorative member formable with various materials, such as resin and ceramic.

The exterior member 70 is provided with a through hole 701. It is preferable that a recess 702 be provided around the through hole 701 so that the head of the screw 91 can be disposed in the recess 702. Because the exterior member 70 is the outermost exterior member of the timepiece body, a beautiful external appearance can be obtained by preventing the head of the screw 91 from projecting from the exterior member 70.

The antenna element 46 is provided with a through hole 462 at a position corresponding to the through hole 701. The through hole 462 is formed to have a diameter large enough for the screw 91 not to contact the antenna element 46 in the through hole 462.

The dielectric member 69 is provided with a hole 691 at a position corresponding to the through hole 701 and the through hole 462.

The screw 91 is inserted from above the exterior member 70 into the hole 691 through the through hole 701 and the through hole 462, so that the exterior member 70, the antenna element 46 and the dielectric member 69 are screw-fastened.

In the through hole 462 of the antenna element 46, a member formed of an insulator (dielectric) may be interposed between the outer peripheral surface of the screw 91 and the through hole 462, or after the screw 91 is inserted, an adhesive (sealant) or the like formed of an insulating (dielectric) material may be put in the through hole 462. This can prevent the screw 91 from contacting the antenna element 46 for sure.

The dielectric member 69 and the body case 10 are fastened with the screw 92 in the same manner as that described with reference to FIG. 19.

Figure 21:
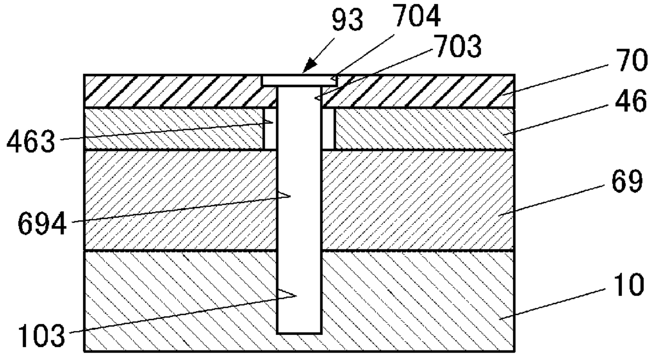
FIG. 21 is a side sectional view showing a modification of the antenna element fastening structure shown in FIG. 12.

Further, for example, as shown in FIG. 21, when the exterior member 70 covering the antenna element 46 is provided, members from the exterior member 70 to the body case 10 may be fastened with one (long) screw 93.

The exterior member 70 is provided with a through hole 703. It is preferable that a recess 704 be provided around the through hole 703 so that the head of the screw 93 can be disposed in the recess 704.

The antenna element 46 is provided with a through hole 463 at a position corresponding to the through hole 703. The through hole 463 is formed to have a diameter large enough for the screw 93 not to contact the antenna element 46 in the through hole 463.

The dielectric member 69 is provided with a through hole 694 at a position corresponding the through hole 703 and the through hole 463.

The body case 10 is provided with a hole 103 at a position corresponding to the through hole 703, the through hole 463 and the through hole 694.

The screw 93 is inserted from above the exterior member 70 into the hole 103 through the through hole 703, the through hole 463 and the through hole 694, so that the exterior member 70, the antenna element 46, the dielectric member 69 and the body case 10 are screw-fastened.

In the through hole 463 of the antenna element 46, a member formed of an insulator (dielectric) may be interposed between the outer peripheral surface of the screw 93 and the through hole 463, or after the screw 93 is inserted, an adhesive (sealant) or the like formed of an insulating (dielectric) material may be put in the through hole 463. This can prevent the screw 93 from contacting the antenna element 46 for sure.

Figure 22:
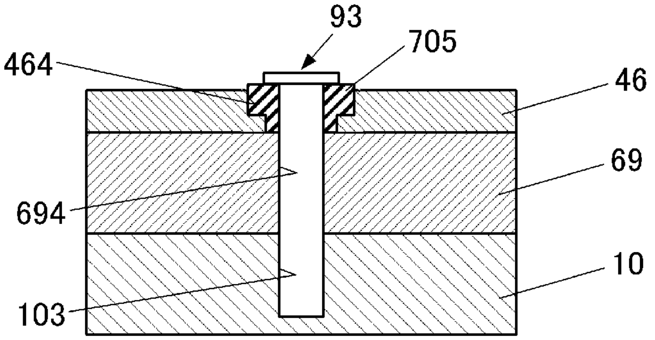
FIG. 22 is a side sectional view showing a modification of the antenna element fastening structure shown in FIG. 12.

When no exterior member is provided, in order that the screw 93 be not in direct contact with the antenna element 46, an insulating coating or the like may be disposed on the head of the screw 93 and/or a portion of the screw 93 disposed in the antenna element 46, or as shown in FIG. 22, an insulating washer 705 or the like formed of an insulating material may be disposed in a through hole 464 of the antenna element 46. This can prevent the screw 93 and the antenna element 46 from short-circuiting.

As described above, according to this embodiment, the timepiece body (100) as an electronic device includes the ring-shaped antenna element 43 and the body case 10 that is formed of a metal material and over the upper portion of which the antenna element 43 is disposed, and the dielectric member 63 is interposed between the antenna element 43 and the body case 10, and the body case 10 functions as a conductive part having the same potential as GND.

Thus, because the body case 10 itself is a conductive part, a separate conductive part is unneeded.

Further, when the body case 10 is formed of a metal, the timepiece body 100 having a high-quality external appearance and an excellent design and a wrist device (e.g. wristwatch) including this timepiece body 100 can be produced.

Further, because the dielectric member 63 is interposed between the antenna element 43 and the body case 10, the characteristics, such as the frequency and the gain, of an antenna configured by including the antenna element 43 can be easily adjusted to desired characteristics by this dielectric member 63 or the like.

Further, the dielectric member 63 may double as a sealing member that makes the inside of the body case 10 watertight.

In this case, a watertight structure can be produced without a separate O-ring or the like.

Further, the characteristics of an antenna configured by including the antenna element 43 may be adjusted by changing the area where the body case 10 and the antenna element 43 lie on (over) top of one another.

For example, the body case 10 is formed such that on the upper portion of the body case 10, the area of a portion where the antenna element 43 lies is smaller than the area of a portion where the antenna element 43 does not lie.

In this case, the antenna characteristics can be adjusted by a method little affecting the external appearance. More specifically, the gain of the antenna can be made higher. This makes designability of an electronic device, such as a timepiece, and adjustment of the frequency and/or the gain of an antenna compatible.

Further, the characteristics of an antenna configured by including the antenna element 43 may be adjusted by changing the distance between the body case 10 and the antenna element 43.

In this case too, the antenna characteristics can be adjusted by a method little affecting the external appearance. This makes designability of an electronic device, such as a timepiece, and adjustment of the frequency and/or the gain of an antenna compatible.

Further, the characteristics of an antenna configured by including the antenna element 43 may be adjusted by changing the shape of the dielectric member 63.

Because the dielectric member 63 is a member that is unlikely to appear in the external appearance, in this case too, the antenna characteristics can be adjusted by a method little effecting the external appearance. This makes designability of an electronic device, such as a timepiece, and adjustment of the frequency and the gain of an antenna compatible.

As a method for changing the shape of the dielectric member 64, the recesses 641 may be formed in a peripheral surface(s) of the dielectric member 64.

Thus, the antenna characteristics can be finely adjusted with a relatively simple method.

When the recesses 641 are formed in a peripheral surface(s) of the dielectric member 64, the second dielectric members 642 having a permittivity different from the body 643 of the dielectric member 64 has may be fitted in the recesses 641.

Thus, the antenna characteristics can be finely adjusted with a relatively simple method.

The dielectric member 65 may be formed of an elastic deformable material, and the antenna element 45 may be press-fitted into, thereby being fastened to, the body case 10 through the dielectric member 65.

This can fasten the antenna element 45 to the body case 10 without increasing the number of parts even when the body case 10 is formed of a metal.

Also, the water-tightness can be ensured by the antenna element 45 being press-fitted into, thereby being fastened to, the body case 10 through the dielectric member 66.

The dielectric member 66 may be provided with the threaded portions 663 on the surface on the contact side with the antenna element 45 and on the surface on the contact side with the body case 10, and the antenna element 45 may be thread-fastened to the body case 10 through the dielectric member 66.

Thus, the antenna element 45 and the body case 10 can be fastened by the dielectric member 66 without a separate member.

The antenna element 46, the dielectric member 69 and the body case 10 may be fastened through/with one or more of the screws 91, 92, 93.

Thus, the antenna element 46, the dielectric member 69 and the body case 10 can be fastened with a relatively simple method.

Although some embodiments or the like of the present disclosure have been described above, it is needless to say that the present invention is not limited to these embodiments or the like, and various modifications can be made without departing from the scope thereof.

For example, in each of the above embodiments or the like, the timepiece body 100 is described as an electronic device, and the timepiece (wristwatch) is described as a wrist device including the electronic device. However, the electronic device of the present disclosure is not limited to timepieces (wristwatches) but applicable to a wide range of devices including antennas.

For example, the electronic device of the present disclosure may be applied to a variety of devices, such as a pedometer, an altimeter or a barometer, or may be applied to a variety of terminal devices, such as a smartphone.

Although several embodiments or the like of the present disclosure have been described above, the scope of the present invention is not limited to the embodiments or the like described above, but includes the scope of the present invention described in the claims below and the scope of their equivalents.

What is claimed is:

1. An electronic device comprising:

an antenna element having a ring shape;

a conductor having a potential same as GND;

a dielectric interposed between the antenna element and the conductor;

a body case disposed below the antenna element;

an exterior member disposed on an upper portion of the body case and covering at least a part of the antenna element; and a screw configured to fix the exterior member to the body case, wherein the screw is insulated from the antenna element and is in a conductive state with the conductor, and wherein the antenna element, the dielectric and the conductor are disposed so as to lie on top of one another in plan view.

2. The electronic device according to claim 1, wherein the conductor is disposed below the antenna element and on the upper portion of the body case, wherein the dielectric is interposed between the conductor and the antenna element, thereby preventing the conductor and the antenna element from contacting one another, and wherein the antenna element and the conductor are electrically connected to the GND.

3. The electronic device according to claim 2, wherein the body case is interposed between the antenna element and the GND.

4. The electronic device according to claim 2, further comprising an electric circuit disposed in the body case, wherein the antenna element is electrically connected to the GND by the electric circuit being electrically connected to the antenna element and the GND.

5. The electronic device according to claim 2, wherein the conductor comprises a conductor film disposed on at least a portion of an upper surface and at least a portion of an inner surface of the body case.

6. The electronic device according to claim 2, wherein the conductor is formed of a material having a lower resistance than a material of the body case has.

7. The electronic device according to claim 2, wherein a characteristic and a shape of the dielectric are set according to a function required for the antenna element.

8. The electronic device according to claim 2, wherein the exterior member covers the antenna element and the dielectric such that the antenna element and the dielectric are not visible from outside the electronic device.

9. The electronic device according to claim 2, wherein the dielectric comprises a sealing member configured to make an inside of the body case watertight.

10. The electronic device according to claim 1, wherein the dielectric is provided with a first alignment part, and wherein the antenna element is provided with a second alignment part at a position corresponding to the first alignment part in a state in which the antenna element is attached to the dielectric, the second alignment part being fitted with the first alignment part.

11. The electronic device according to claim 1, wherein the GND is disposed below the antenna element.

12. The electronic device according to claim 1, wherein the body case is formed of a metal material, wherein the dielectric is interposed between the antenna element and the body case, and wherein the body case and the conductor are formed as a single structure and having the potential same as the GND.

13. The electronic device according to claim 12, wherein the dielectric comprises a sealing member configured to make an inside of the body case watertight.

14. The electronic device according to claim 12, wherein on the upper portion of the body case, an area of a portion of the body case where the antenna element lies is smaller than an area of a portion of the body case where the antenna element does not lie.

15. The electronic device according to claim 12, wherein a peripheral surface of the dielectric is provided with a recess.

16. The electronic device according to claim 15, wherein the dielectric is a first dielectric having a first permittivity, wherein the electronic device further comprises a second dielectric in the recess, and wherein the second dielectric has a second permittivity different from the first permittivity.

17. A wrist device comprising the electronic device according to claim 1.

* * * * *